(12) United States Patent
Chen (10) Patent No.: US 11,084,419 B1
(45) Date of Patent: Aug. 10, 2021

(54) LIGHT-EMITTING APPARATUS FOR AUTOMOBILE SUNROOF

(71) Applicant: Keng-Sheng Chen, New Taipei (TW)

(72) Inventor: Keng-Sheng Chen, New Taipei (TW)

( * ) Notice: Subject to any disclaimer, the term of this patent is extended or adjusted under 35 U.S.C. 154(b) by 0 days.

(21) Appl. No.: 17/168,811

(22) Filed: Feb. 5, 2021

(51) Int. Cl.
| | |
|---|---|
| *B60Q 3/208* | (2017.01) |
| *F21V 9/32* | (2018.01) |
| *F21V 8/00* | (2006.01) |
| *B60Q 3/68* | (2017.01) |
| *B60Q 3/80* | (2017.01) |
| *B60Q 3/62* | (2017.01) |
| *F21Y 113/10* | (2016.01) |
| *F21Y 115/10* | (2016.01) |

(52) U.S. Cl.
CPC ............... *B60Q 3/208* (2017.02); *B60Q 3/62* (2017.02); *B60Q 3/68* (2017.02); *B60Q 3/80* (2017.02); *F21V 9/32* (2018.02); *G02B 6/0035* (2013.01); *G02B 6/0073* (2013.01); *F21Y 2113/10* (2016.08); *F21Y 2115/10* (2016.08)

(58) Field of Classification Search
CPC . B60Q 3/208; B60Q 3/62; B60Q 3/68; B60Q 3/80; F21V 9/32; F21Y 2113/10; F21Y 2115/10; G02B 6/0035; G02B 6/0073
USPC .................. 362/493, 503–504, 511
See application file for complete search history.

(56) References Cited

U.S. PATENT DOCUMENTS 9,871,199 B2 * 1/2018 Schwenke .................. B60J 1/08

FOREIGN PATENT DOCUMENTS

| CN | 103770696 B | 10/2016 |
|---|---|---|
| CN | 107471978 A | 12/2017 |
| CN | 109624837 B | 7/2020 |

\* cited by examiner

*Primary Examiner* — Jason M Han
(74) *Attorney, Agent, or Firm* — Rabin & Berdo, P.C.

(57) ABSTRACT

A light-emitting apparatus for an automobile sunroof with a changing display pattern is provided, comprising: a light-guiding layer, a light-emitting module, and a fixing batten; wherein a coating layer is provided on the first surface of the light-guiding layer, and the coating layer includes a first pattern and the second pattern, the second surface of the light-guiding layer includes a third pattern; the light-emitting module includes a plurality of first light-emitting elements, second light-emitting elements, third light-emitting elements, and limiting blocks; the first light-emitting element emits ultraviolet light to make the first pattern produce a fluorescent reaction; the second light-emitting element emits infrared light to make the second patterns produce a fluorescent reaction; the third light-emitting element emits primary color light to make the third pattern appear through reflection and refraction.

8 Claims, 10 Drawing Sheets

LIGHT-EMITTING APPARATUS FOR AUTOMOBILE SUNROOF

BACKGROUND OF THE INVENTION

1. Field of the Invention

The present invention relates generally to a light-emitting apparatus installed on the surface of an automobile sunroof glass to create an atmosphere, and more particularly, to a light-emitting apparatus for an automobile sunroof capable of changing display patterns.

2. The Prior Arts

The sunroof is commonly configured in cars. In addition to opening the sunroof to obtain good ventilation effect inside the car and for the occupant to enjoy the air in the suburbs, people also hope to appreciate the night sky view outside when the sunroof is closed, but the functions of the conventional sunroof function end here. Therefore, to create an atmosphere in the car to enhance the driving experience, the application of ambient light technology to automobile sunroofs has been widely used in mid-to-high-end vehicles.

For example, Chinese patent publication No. CN107471978A discloses a luminous vehicle window glass; Chinese patent No. CN109624837B discloses a sunroof glass for adjusting the atmosphere in a vehicle; Chinese patent No. CN103770696B discloses a vehicle assembly glass.

Wherein, the luminous vehicle window glass disclosed in Chinese patent publication No. CN107471978A includes a first transparent plate, a first transparent adhesive layer, a flexible transparent substrate, a second transparent adhesive layer, and a second transparent plate that are sequentially stacked from top to bottom. The refractive index of the second transparent adhesive layer is the same as that of the second transparent plate. The refractive index of the second transparent adhesive layer is greater than that of the flexible transparent substrate. The side edge of the second transparent plate is provided with a linear light source, so that the incident light from the linear light source enters from the side edge of the second transparent plate and/or the second transparent adhesive layer, and is guided and transmitted between the second transparent plate and the second transparent adhesive layer. The lower surface of the flexible transparent substrate is provided with a scattering layer for scattering the incident light from a linear light source.

Wherein, the sunroof glass for adjusting the atmosphere in a vehicle disclosed in Chinese patent No. CN109624837B includes a first glass plate, an adhesive layer, a flexible sheet layer and a second glass plate, stacked from top to bottom, and a light source is arranged on the side of the second glass plate. The refractive index of the second glass plate is greater than the refractive index of the flexible sheet layer, the lower surface of the flexible sheet layer is provided with a reflective pattern, the boundary of the flexible sheet layer is inwardly contracted by 3-30 mm relative to the boundary of the second glass plate, and the adhesive layer together with the second glass plate seal and cover the flexible sheet layer, and the lower surface of the flexible sheet layer is closely attached to the upper surface of the second glass plate. The reflective pattern is directly made on the flexible sheet layer, so that the reflective pattern can better fit the glass shape with small curvature and large arch. The lower surface of the flexible sheet layer is closely attached to the upper surface of the second glass plate, and the reflective pattern is directly in contact with the upper surfaces of the second glass plate.

Wherein, the vehicle assembly glass disclosed in Chinese patent No. CN103770696B includes a glass plate, a light-guiding layer, a refraction layer, and a light source; the light-guiding layer is configured to guide the light coupled with and inputted from the end surface, and has a coupling output device. Through the coupling output device, the guided light outputs from at least one main surface of the light-guiding layer; the light-guiding layer is connected to the glass plate materially; the refraction layer is arranged between the glass plate and the light-guiding layer, the refraction layer has a lower refractive index than the light-guiding layer, and the refractive layer is simultaneously configured as a sheet layer; the light source is arranged to be optically coupled to at least one end surface of the light-guiding layer.

The common feature of the aforementioned several published patent documents is that only the glass has a luminous effect, or it can only produce a single reflective pattern without changing the illumination effect. In addition, there is no structure configured to protect the light-emitting element, so that the light-emitting element can be easily damaged by collision during assembly.

SUMMARY OF THE INVENTION

A primary objective of the present invention is to provide a light-emitting apparatus suitable for installation on the sunroof glass of an automobile. The light-emitting apparatus can change the displayed light-emitting pattern to create a more varied and comfortable atmosphere inside the automobile.

Another objective of the present invention is to provide a light-emitting apparatus suitable for installation on a sunroof glass of an automobile, which is configured with a structure to protect the light-emitting element, so that the light-emitting apparatus avoids collision damage to the light-emitting element when the light-emitting apparatus is installed on the sunroof.

For achieving the foregoing objectives, the present invention provides a light-emitting apparatus for an automobile sunroof with a changing display pattern, comprising: a light-guiding layer, having a first surface provided with a coating layer with a first pattern, and the first pattern being formed with a first ink able to produce a fluorescent reaction caused by ultraviolet light, a first adhesive layer being provided around the first surface; and having a second surface opposite to the first surface, a third pattern being formed on the second surface, the third pattern comprising a plurality of concave holes able to reflect and refract light; a light-emitting module, comprising a printed circuit board, a plurality of first light-emitting elements, a plurality of third light-emitting elements, and a plurality of limiting blocks, arranged on the printed circuit board, the plurality of first light-emitting elements being for emitting ultraviolet light, the plurality of third light-emitting elements being for emitting primary light, and the plurality of limiting blocks being closer to one side of the printed circuit board than the plurality of first light-emitting elements; and a fixing batten, provided for disposing the light-emitting module thereon, so that the light incident edge of the light-guiding layer contacting the plurality of limiting blocks and adjacent to the plurality of first light-emitting elements and the plurality of third light-emitting elements; and the fixing batten also being provided with a second adhesive layer; wherein the light-guiding layer being fixed to a surface of a sunroof through the first adhesive layer, and the fixing batten being fixed to the surface of the sunroof through the second adhesive layer.

In an embodiment, the first light-emitting element is an ultraviolet LED, and the third light-emitting element is a primary color LED.

In another embodiment, the coating layer further comprises a second pattern, and the second pattern is formed by a second ink able to produce a fluorescent reaction with infrared light and does not overlap the first pattern, and the printed circuit board is further disposed with a plurality of second light-emitting elements, the plurality of second light-emitting elements are for emitting infrared light, and the plurality of limiting blocks are closer to one side of the printed circuit board than the plurality of second light-emitting elements.

In another embodiment, the second light-emitting element is an infrared LED.

In an embodiment, the third pattern is formed by using a laser engraving method to form a plurality of concave holes on the second surface of the light-guiding layer.

In an embodiment, the plurality of first light-emitting elements are arranged linearly on the printed circuit board, and each of the limiting blocks is disposed between a portion of two adjacent first light-emitting elements.

In an embodiment, one of the first light-emitting element, one of the second light-emitting element, and one of the third light-emitting elements are sequentially arranged into a light-emitting unit, and a plurality of the light-emitting units are arranged linearly on the printing circuit board, and each of the limiting blocks is arranged between adjacent light-emitting units.

In one embodiment, the fixing batten has an upper surface formed with a first protrusion and a second protrusion, and a recess is formed between the first protrusion and the second protrusion; the printed circuit board is fixed to the bottom surface of the recess through a third adhesive layer.

Through the aforementioned light-emitting apparatus, when installed on the sunroof glass of an automobile, the present invention can display fluorescent or reflective patterns more variably by switching among different light-emitting elements to create a richer and more comfortable atmosphere inside the automobile. And during the installation to the sunroof, the light-emitting elements in the light-emitting module can be properly protected to avoid collision damage.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
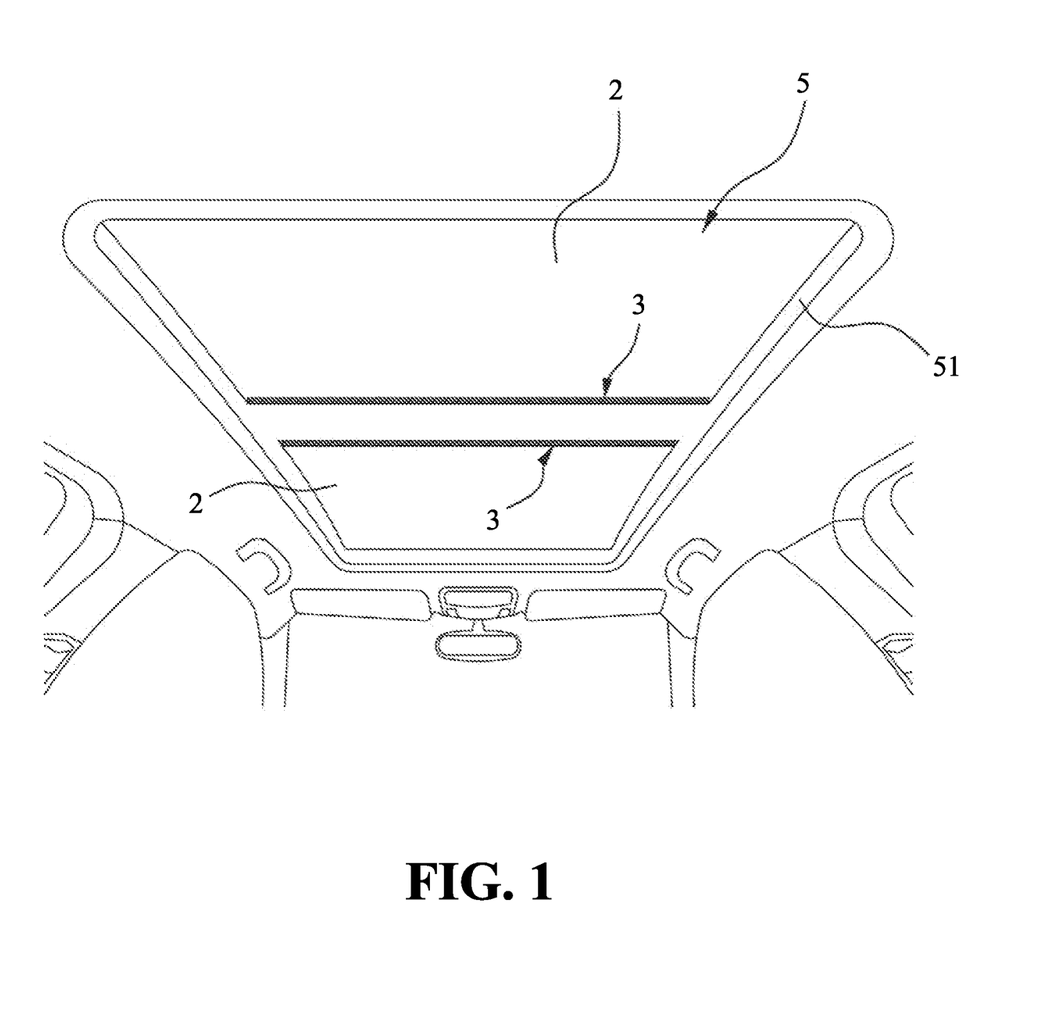
FIG. 1 is a schematic view showing the state of the light-emitting apparatus of the present invention installed on the sunroof glass of an automobile.
Figure 2:
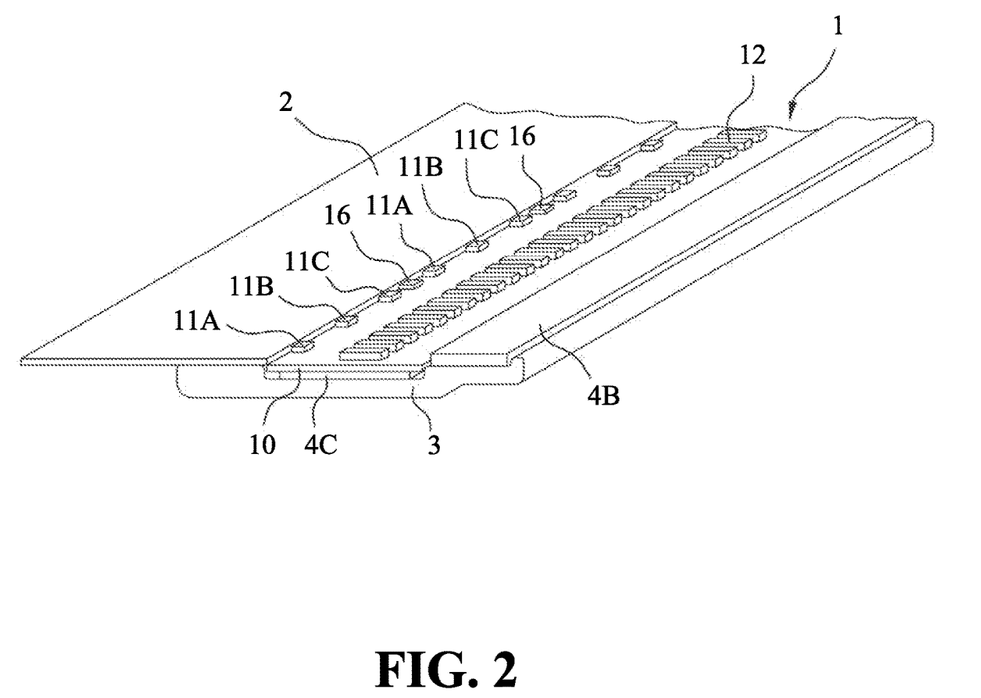
FIG. 2 is a partial perspective view showing the structure of the light-emitting apparatus of the present invention.
Figure 3:
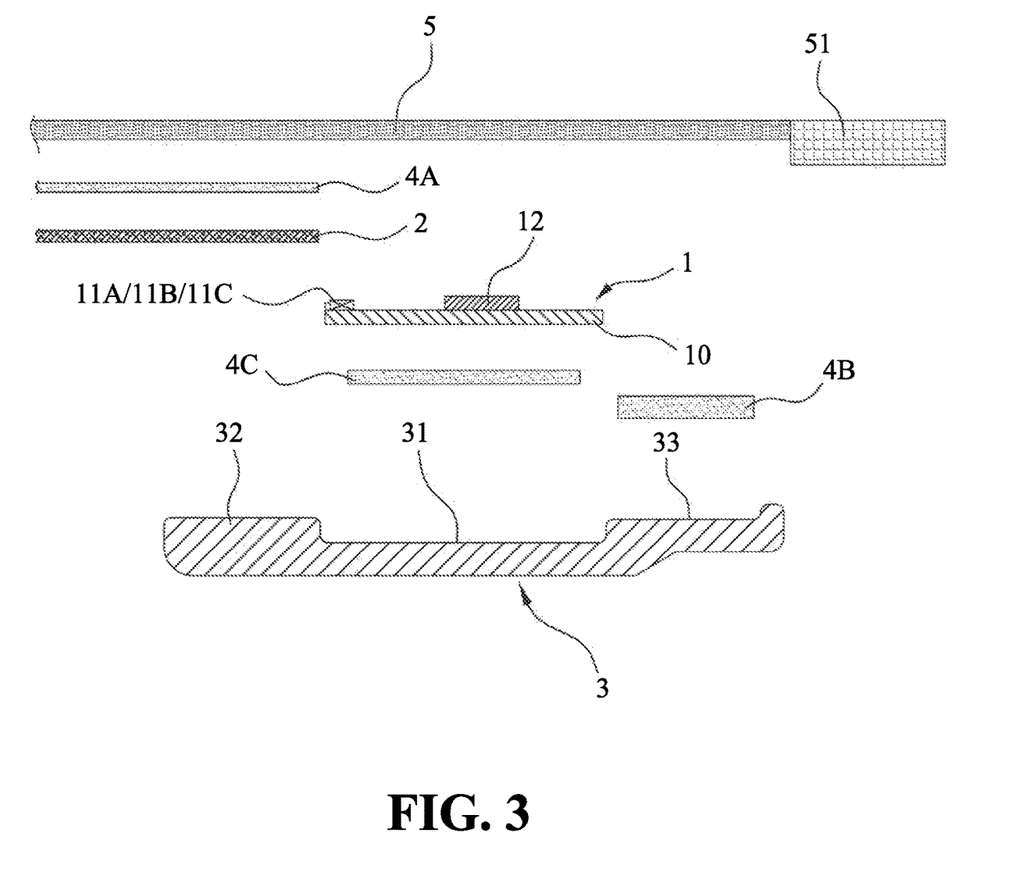
FIG. 3 is a cross-sectional exploded view showing the assembly relationship of elements included in the light-emitting apparatus of the present invention.

FIG. 1 is a schematic view showing the state of the light-emitting apparatus of the present invention installed on the sunroof glass of an automobile; FIG. 2 is a partial perspective view showing the structure of the light-emitting apparatus of the present invention; FIG. 3 is a cross-sectional exploded view showing the assembly relationship of elements included in the light-emitting apparatus of the present invention; and FIG. 4 is a cross-sectional view showing the assembly structure of the light-emitting apparatus of the present invention.

Figure 4:
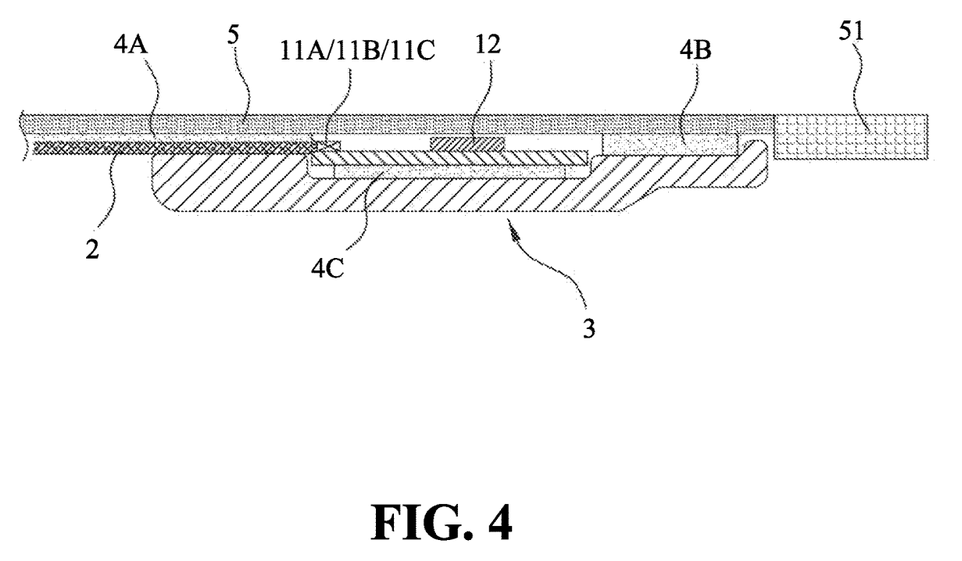
FIG. 4 is a cross-sectional view showing the assembly structure of the light-emitting apparatus of the present invention.

As shown in FIGS. 2-4, the light-emitting apparatus for automobile sunroofs with changing display patterns provided by the present invention is mainly used for light-emitting apparatus installed on automobile sunroof glass, and includes: a light-emitting module 1, a light-guiding layer 2 and a fixing batten 3; wherein, the light-guiding layer 2 is a plate-shaped body made of a transparent material with good light-guiding properties and an appropriate thickness, preferably a soft transparent material that can guide light and can be cut, assembled and attached to suit the size and curvature of the sunroof glass.

Figure 6:
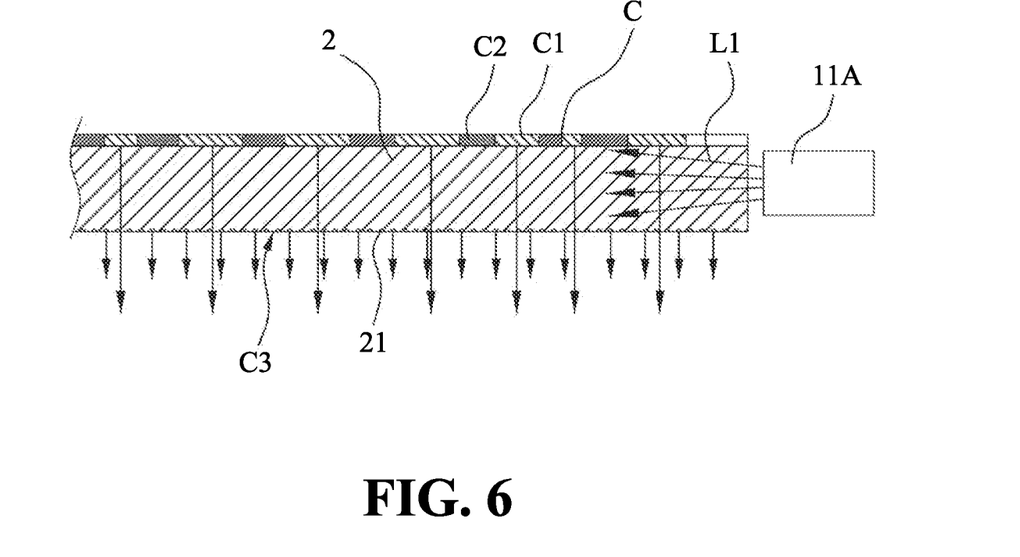
FIG. 6 is a schematic side cross-sectional view showing that the first light-emitting element of the light-emitting apparatus of the present invention emits ultraviolet light to cause the first pattern of the coating layer to produce a fluorescent reaction and to reflect and refract the third pattern simultaneously.

The two opposite planes of the light-guiding layer 2 are defined as a first surface and a second surface respectively. In the present invention, a first ink and a second ink can be preferably embossed or printed on the first surface of light-guiding layer 2 to form a first pattern C1 and a second pattern C2 respectively that do not overlap each other, and the first pattern C1 and the second pattern C2 together form a coating layer C on the first surface of the light-guiding layer 2, as shown in FIG. 6.

The basic ingredients of the first ink and the second ink include: pigments, binding agents and additives, which are all inorganic compounds or organic compounds, and the ratio of the ingredients is adjusted appropriately to make into printing inks with different characteristics. For example, adding appropriate fluorescent or phosphorescent pigment powder to the ink can make the printed pattern with a fluorescent or phosphorescent reaction. The present invention uses colorless fluorescent pigments as an ingredient of the first ink and the second ink, and adds different additives to the first ink and the second ink to make the first pattern C1 printed by the first ink produces fluorescent reaction and emits light when receiving ultraviolet light, but does not produce fluorescent reaction when receiving other light and is almost invisible; that is, the first ink can be regarded as an invisible ink; the second pattern C2 printed by the second ink produces fluorescent reaction and emits light when receiving infrared light, which is invisible light, but does not produce fluorescent reaction when receiving other light; that is, the second ink is also an invisible ink.

Figure 9:
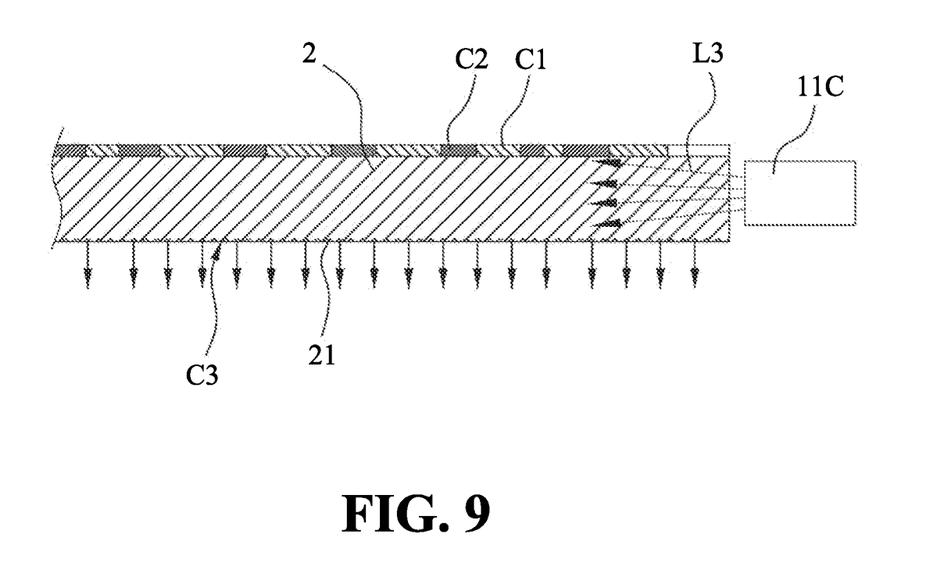
FIG. 9 is a schematic side cross-sectional view showing that the third light-emitting element of the light-emitting apparatus of the present invention emits light to reflect and refract to form the third pattern.

As shown in FIG. 9, the first pattern C1 can be any pattern; the second pattern C2 can be any pattern different from the first pattern C1, or even a pattern complementary to the first pattern C1, but the first pattern C1 and the second pattern C2 do not overlap each other.

The second surface of the light-guiding layer 2 can use laser engraving technology to form a plurality of small concave holes on the surface thereof, and the plurality of concave holes 21 form the third pattern C3. Through the structure of the plurality of small concave holes 21, the light transmitted in the light-guiding layer 2 will be reflected and refracted when the light hits the concave holes 21, making the light brighter at the concave holes 21 than at the other places, thereby showing a third pattern C3 that emits light.

In another embodiment, the present invention can also provide only the first pattern C1 or only the second pattern C2 on the coating layer C on the first surface of the light-guiding layer, instead of simultaneously providing the first pattern C1 and the second pattern C2 (not shown).

Figure 5:
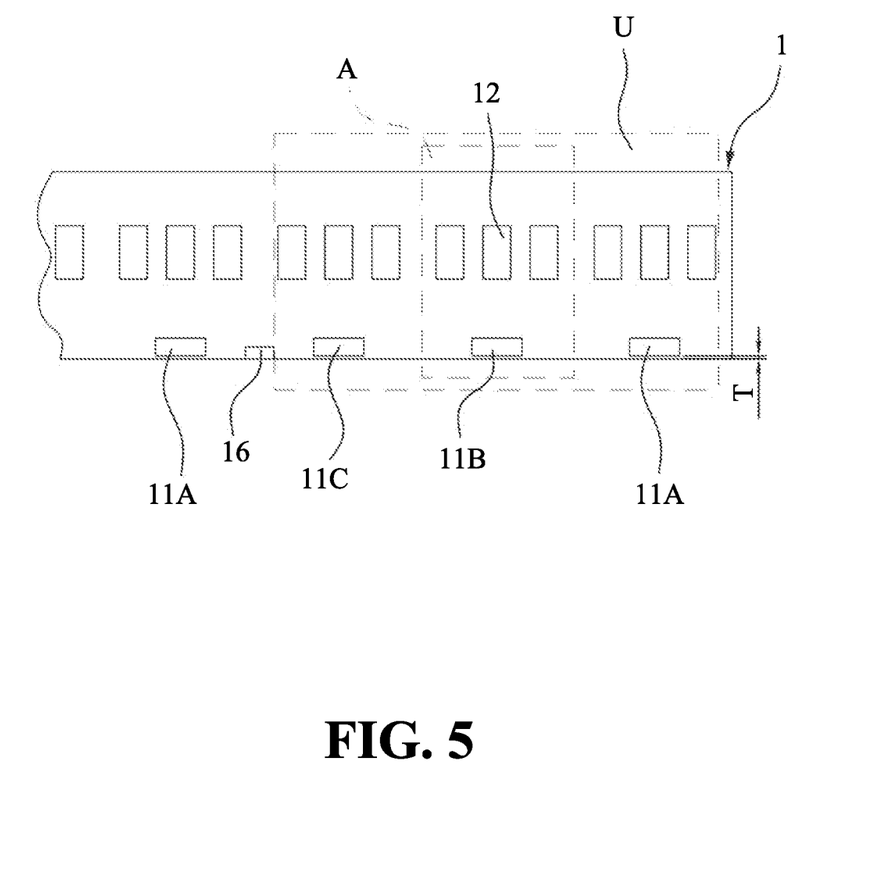
FIG. 5 is a partial planar view showing the arrangement relationship between the light-emitting element and the limiting block of the light-emitting apparatus of the present invention.

As shown in FIG. 2 and FIG. 5, the light-emitting module 1 preferably includes a printed circuit board 10, a plurality of first light-emitting elements 11A, a plurality of second light-emitting elements 11B, a plurality of third light-emitting element 11C, and a plurality of limiting blocks 16; the plurality of first light-emitting elements 11A preferably are ultraviolet light-emitting diodes (UV LED) for emitting ultraviolet light; the plurality of the second light-emitting elements 11B are preferably Infrared light emitting diodes (IR LEDs) emitting infrared light; the plurality of third light-emitting elements 11C preferably are primary color light-emitting diodes (RGB LEDs) for emitting blue, red, and green lights, i.e., three primary colors of light; the plurality of limiting blocks 16 are closer to one side of the printed circuit board 10 than the plurality of first light-emitting elements 11A, second light-emitting elements 11B, and third light-emitting elements 11C.

More specifically, when the first surface of the light-guiding layer 2 is provided with the coating layer C including the first pattern C1 and the second pattern C2, and the second surface of the light-guiding layer 2 is provided with the third pattern C3, as shown in FIG. 5, the corresponding light-emitting module 1 first arranges a first light-emitting element 11A, a second light-emitting element 11B, and a third light-emitting element 11C in sequence into a light-emitting unit U, and then arranges a plurality of the light-emitting units U in a straight line on the printed circuit board 10, and the limiting block 16 are disposed between the first light-emitting element 11A and the second light-emitting element 11B, or between the second light-emitting element 11B and the third light-emitting element 11C, or between the first light-emitting element 11A and the third light-emitting element 11C without restriction; each limiting block 16 is disposed on the printed circuit closer to board 10 closer to the edge than the first light-emitting element 11A, the second light-emitting element 11B, and the third light-emitting element 11C. Therefore, there is a gap T between the limiting block 16 and the light-emitting surfaces of the first, second, and third light-emitting components 11A, 11B, and 11C, as shown in FIG. 5. In addition, a plurality of current driving elements 12, such as resistors, are used with a first light-emitting element 11A, a second light-emitting element 11B, or a third light-emitting element 11C to form a light-emitting element module A, and each light-emitting element module A can be controlled through input current to make the first light-emitting element 11A, the second light-emitting element 11B, or the third light-emitting element 11C emit light.

Although not shown in the figure, it should be understood with reference to FIG. 5 and FIG. 6 that when the coating layer C on the first surface of the light-guiding layer 2 is provided with only the first pattern C1 or only the second pattern C2, the corresponding light emitting module 1 only has a plurality of first light-emitting components 11A and a third light-emitting element 11C, or a plurality of second light-emitting elements 11B and a third light-emitting element 11C, arranged in a straight line on the printed circuit board 10.

The fixing batten 3 is an assembly for installation and fixing provided for the light-emitting module 1 to mount on, and the entire light-emitting apparatus is installed and fixed on the sunroof glass of an automobile; as shown in FIG. 2 and FIG. 4, the fixing batten 3 is monolithically formed as a ring frame, with a first protrusion 32 and a second protrusion 33 formed on the upper surface, and a recess 31 formed between the first protrusion 32 and the second protrusion 33. The first protrusion 32 is flush with the upper surface of a second protrusion 33, and the bottom surface of the recess 31 is lower than the upper surfaces of the first protrusion 32 and the second protrusion 33.

The method of installing the light-emitting apparatus of the present invention on an automobile sunroof is described as follows:

As shown in FIG. 3, first, the printed circuit board 10 is fixed to the bottom surface of the recess 31 of the fixing batten 3 through a third adhesive layer 4C; the third adhesive layer 4C can be a double-sided foam tape; after sticking one side of the third adhesive layer 4C to the bottom surface of the printed circuit board 10, the other side of the third adhesive layer 4C is stuck to the bottom surface of the recess 31 to fix the printed circuit board 10 to the recess 31.

Then, one side of a first adhesive layer 4A is adhered to the first surface of the light-guiding layer 2 where the coating layer C has been set, and then the other side of the first adhesive layer 4A is adhered the surface of an automobile sunroof glass 5, so that the light-guiding layer 2 is fixed to the automobile sunroof glass 5.

Finally, one side of a second adhesive layer 4B is adhered to the upper surface of the second protrusion 33 of the fixing batten 3, and then the other side of the second adhesive layer 4B is adhered to the surface of the automobile sunroof glass 5, and the first protrusion 32 of the fixing batten 3 pressed on the lower surface of the light-guiding layer 2 so that the light-guiding layer 2 is further firmly fixed to the sunroof glass 5. During the aforementioned installation process, the position of the fixing batten 3 is appropriately adjusted so that the outer edge of the fixing batten 3 abuts against the inner edge of the glass frame 51 of the sunroof to meet the visual aesthetics. At the same time, during the installation process, the light incident surface on the side of the light-guiding layer 2 is pressed against the limiting block 16 and then the second adhesive layer 4B is adhered to the sunroof glass 5. As such, in the installation process, the light-guiding layer 2 will not touch the first light-emitting element 11A and the second light-emitting element 11B, so each light-emitting element can be protected from damage.

Figure 10:
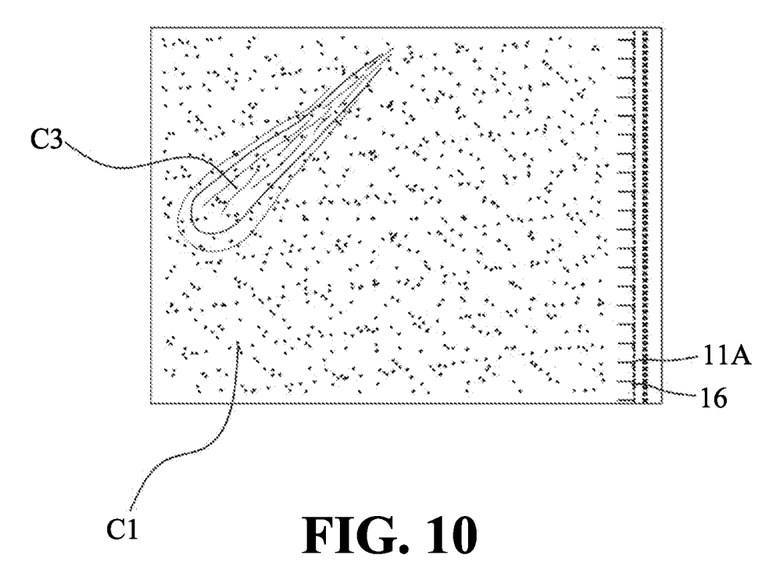
FIG. 10 is a schematic planar view showing the first light-emitting element of the light-emitting apparatus of the present invention emits ultraviolet light to generate the first pattern and to reflect and refract the third pattern simultaneously.

The light-emitting apparatus of the present invention is preferably provided with a coating layer C including a first pattern C1 and a second pattern C2 on the first surface of the light-guiding layer 2, and a third pattern C3 is provided on the second surface, and the light-emitting module 1 is provided with a first light-emitting element 11A, a second light-emitting element 11B, and a third light-emitting element 11C. The first light-emitting element 11A, the second light-emitting element 11B, and the third light-emitting element 11C can be selectively switched on and off by an IC circuit and a switch, Therefore, the use of the present invention is described as follows:

As shown in FIG. 6 and FIG. 10, when the circuit is switched to make only the first light-emitting element 11A emit ultraviolet light L1, only the first pattern C1 produces a fluorescent reaction to the ultraviolet light L1 to emit light, and the second pattern C2 produces no fluorescent reaction and no light is emitted, so that the luminous first pattern C1 reflects on the second surface of the light-guiding layer 2, and the occupants in the vehicle can see the first pattern on the sunroof when looking up. At the same time, the ultraviolet light L1 emitted by the first light-emitting element 11A is also reflected and refracted in the concave holes 21 of the third pattern C3, so that the third pattern C3 also emits light and reflects on the second surface of the light-guiding layer 2.

Figure 7:
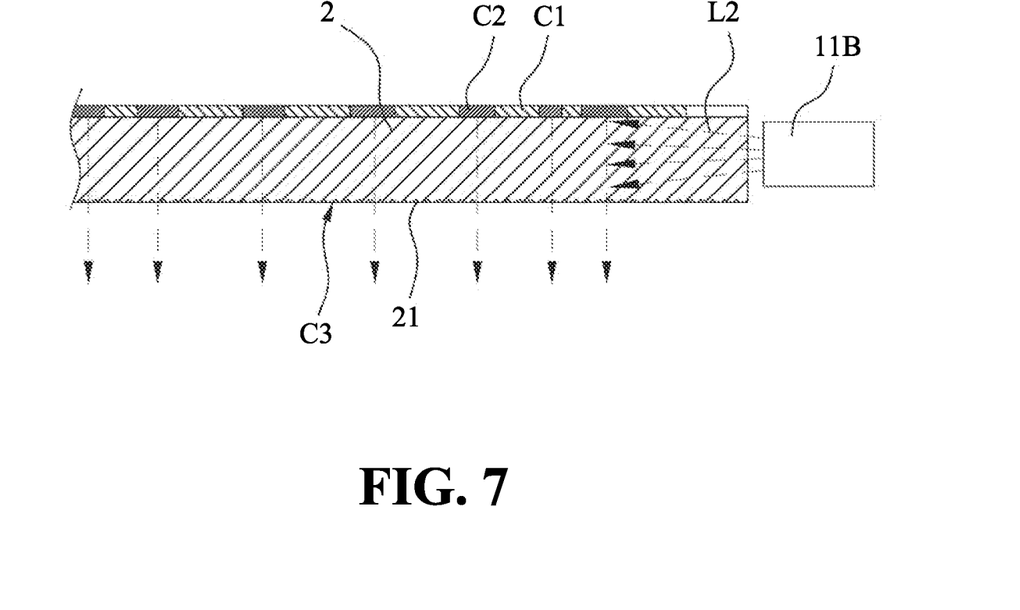
FIG. 7 is a schematic side cross-sectional view showing that the second light-emitting element of the light-emitting apparatus of the present invention emits infrared light to cause the second pattern of the coating layer to produce a fluorescent reaction.
Figure 11:
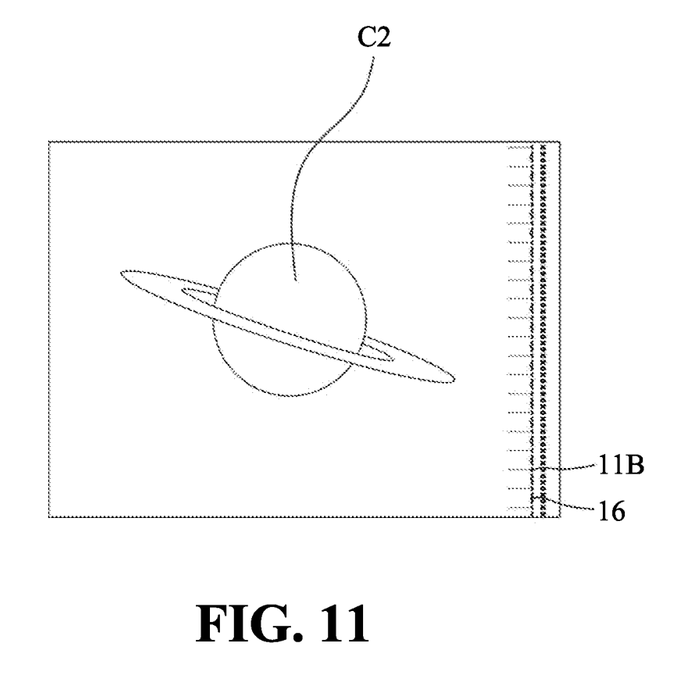
FIG. 11 is a schematic planar view showing the second light-emitting element of the light-emitting apparatus of the present invention emits infrared light to generate the second pattern.

As shown in FIG. 7 and FIG. 11, when the circuit is switched to make only the second light-emitting element 11B emit infrared light L2, only the second pattern C2 produces a fluorescent reaction to the infrared light L2 and reflects light, and the first pattern C1 does not produce fluorescent reaction and does not emit light, so that the luminous second pattern C2 reflects on the second surface of the light-guiding layer 2, and the occupants in the vehicle can see the second pattern on the sunroof when looking up. Since the infrared light L2 is invisible light, when only the second light-emitting element 11B emits the infrared light L2, the third pattern C1 will not emit light.

Figure 8:
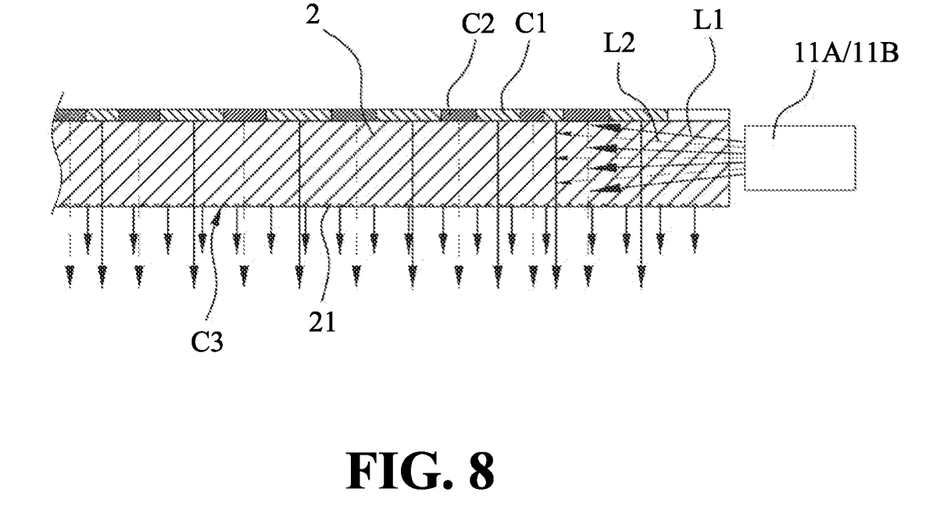
FIG. 8 is a schematic side cross-sectional view showing that the first light-emitting element and the second light-emitting element of the light-emitting apparatus of the present invention emit light at the same time, so that the first pattern and the second pattern simultaneously produce a fluorescent reaction.
Figure 12:
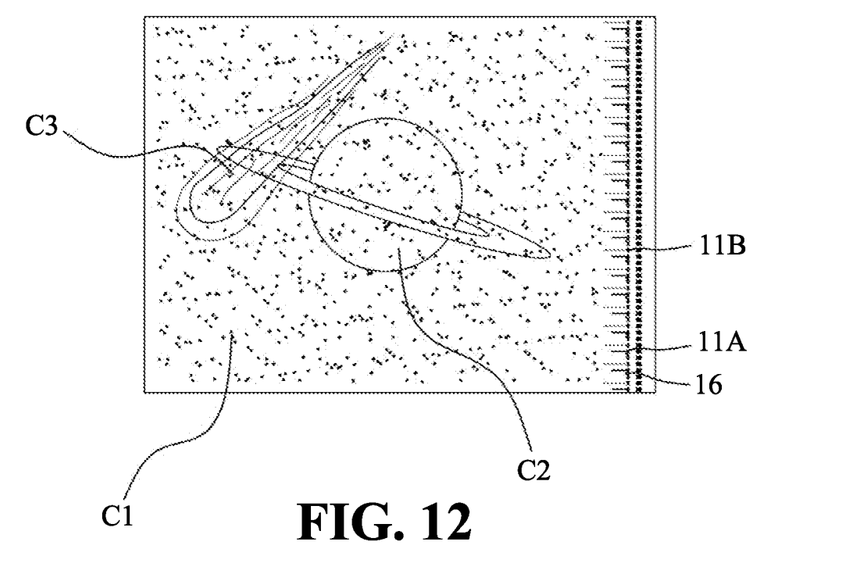
FIG. 12 is a schematic planar view showing that the first light-emitting element and the second light-emitting element of the light-emitting device of the present invention emit ultraviolet light and infrared light respectively to generate a first pattern and a second pattern that emit light, while reflecting and refracting the third pattern.

As shown in FIG. 8 and FIG. 12, when the circuit is switched to make the first light-emitting element 11A emit ultraviolet light L1 and the second light-emitting element 11B emit infrared light L2 at the same time, the first pattern C1 produces a fluorescent reaction to the ultraviolet light L1 and emits light, the second pattern C2 also produces a fluorescent reaction to the infrared light L2 to emit light, and the ultraviolet light L1 is reflected and refracted by the concave holes 21 of the third pattern C3 to emit light, thereby simultaneously displaying the first pattern C1, the second pattern C2 and the third pattern C3 on the second surface of the light-guiding layer 2. The first pattern C1, the second pattern C2, and the third pattern C3 that are properly designed and coordinated can present a more three-dimensional visual effect through the distance among one another.

Figure 13:
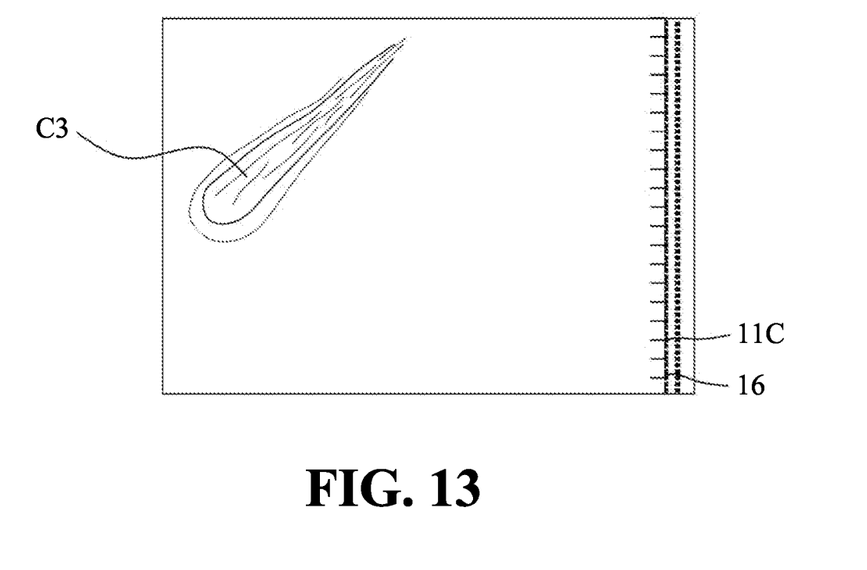
FIG. 13 is a schematic planar view showing the third light-emitting element of the light-emitting apparatus of the present invention emits primary light to reflect and refract to generate the third pattern.

As shown in FIG. 9 and FIG. 13, when the circuit is switched to make only the third light-emitting element 11C emits the three primary colors of light L3, only the concave holes 21 of the third pattern C3 reflect and refract the three primary colors of light L3 to emit light. The first pattern C1 and the second pattern C2 do not produce fluorescent reaction and do not emit light, so that only the third pattern C3 is presented on the second side of the light-guiding layer 2, and the occupants in the car can see the third pattern on the sunroof when looking up. The third light-emitting element 11C can also be controlled to emit red, blue or green light separately or simultaneously, so that the third pattern presents a more colorful visual effect.

Figure 14:
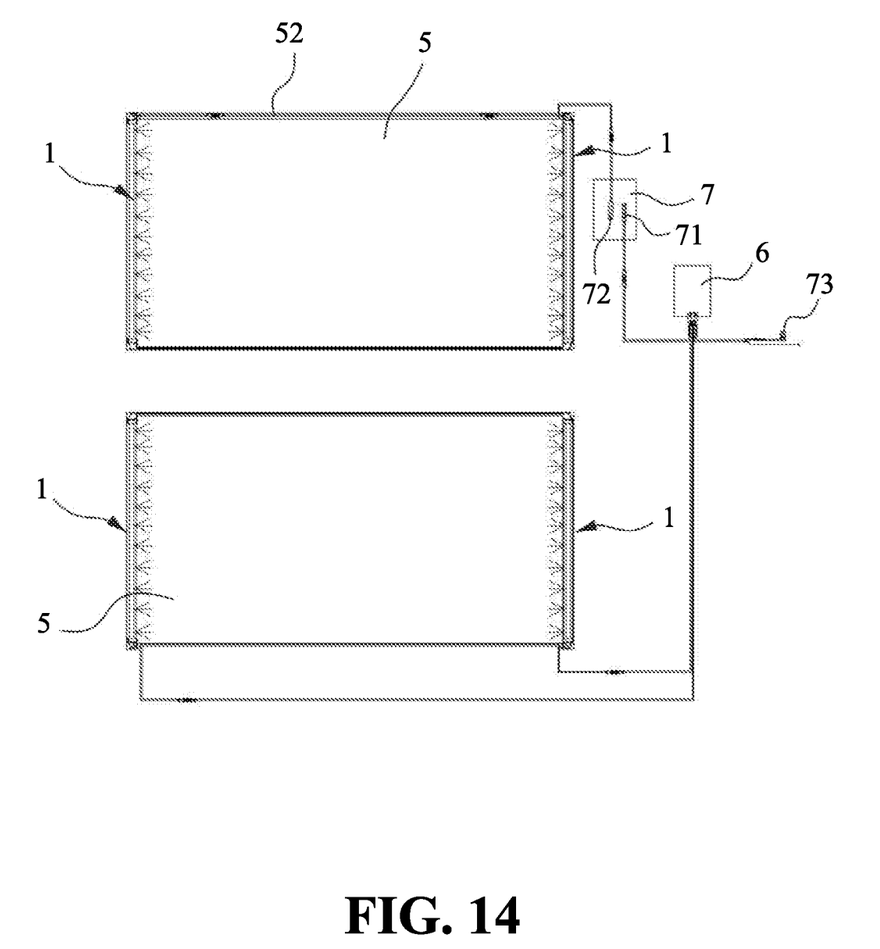
FIG. 14 is a schematic view showing the arrangement of the light-emitting apparatus of the present invention installed on the sunroof glass.

FIG. 14 is a schematic view showing the arrangement of the light-emitting apparatus of the present invention installed on the sunroof glass. In addition to installing the light-emitting module on one side of the sunroof glass in the foregoing embodiment, F13. 13 shows that the light-emitting apparatus of the present invention can also have the light-emitting module 1 installed on opposite sides of a fixed or movable sunroof glass 5. In addition, wiring grooves 52 are respectively installed on the side of the sunroof glass 5 where the light-emitting module is not installed. A wire harness 72 electrically connected to the light-emitting module 1 is arranged along the wiring grooves 52, and the wire harness 72 can be electrically connected through the wire plug box 7 to the power line 71, and a control box 6 can be electrically connected to the wire harness 72. When the control box 6 is operated, the first light-emitting element 11A, the second light-emitting element 11B, and the third light-emitting element 11C can be controlled by the IC circuit set in the control box 6 to emit light, thereby producing the aforementioned visual effect.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A light-emitting apparatus for an automobile sunroof with a changing display pattern, comprising:
   a light-guiding layer, having a first surface provided with a coating layer with a first pattern, and the first pattern being formed with a first ink able to produce a fluorescent reaction caused by ultraviolet light, a first adhesive layer being provided around the first surface; and having a second surface opposite to the first surface, a third pattern being formed on the second surface, the third pattern comprising a plurality of concave holes able to reflect and refract light;

a light-emitting module, comprising a printed circuit board, a plurality of first light-emitting elements, a plurality of third light-emitting elements, and a plurality of limiting blocks, arranged on the printed circuit board, the plurality of first light-emitting elements being for emitting ultraviolet light, the plurality of third light-emitting elements being for emitting primary light, and the plurality of limiting blocks being closer to one side of the printed circuit board than the plurality of first light-emitting elements; and a fixing batten, provided for disposing the light-emitting module thereon, so that the light incident edge of the light-guiding layer contacting the plurality of limiting blocks and adjacent to the plurality of first light-emitting elements and the plurality of third light-emitting elements; and the fixing batten also being provided with a second adhesive layer;

wherein the light-guiding layer being fixed to a surface of a sunroof through the first adhesive layer, and the fixing batten being fixed to the surface of the sunroof through the second adhesive layer.

2. The light-emitting apparatus according to claim 1, wherein the first light-emitting element is an ultraviolet LED, and the third light-emitting element is a primary color LED.

3. The light-emitting apparatus according to claim 2, wherein the plurality of first light-emitting elements are arranged linearly on the printed circuit board, and each of the limiting blocks is disposed between a portion of two adjacent first light-emitting elements.

4. The light-emitting apparatus according to claim 1, wherein:

the coating layer further comprises a second pattern, and the second pattern is formed by a second ink able to produce a fluorescent reaction with infrared light and does not overlap the first pattern, and the printed circuit board is further disposed with a plurality of second light-emitting elements, the plurality of second light-emitting elements are for emitting infrared light, and the plurality of limiting blocks are closer to one side of the printed circuit board than the plurality of second light-emitting elements.

5. The light-emitting apparatus according to claim 4, wherein the second light-emitting element is an infrared LED.

6. The light-emitting apparatus according to claim 5, wherein one of the first light-emitting element, one of the second light-emitting element, and one of the third light-emitting elements are sequentially arranged into a light-emitting unit, and a plurality of the light-emitting units are arranged linearly on the printing circuit board, and each of the limiting blocks is arranged between adjacent light-emitting units.

7. The light-emitting apparatus according to claim 1, wherein the third pattern is formed by using a laser engraving method to form a plurality of concave holes on the second surface of the light-guiding layer.

8. The light-emitting apparatus according to claim 1, wherein the fixing batten has an upper surface formed with a first protrusion and a second protrusion, and a recess is formed between the first protrusion and the second protrusion; the printed circuit board is fixed to the bottom surface of the recess through a third adhesive layer.

* * * * *